United States Patent [19]
Wang

[11] Patent Number: 5,570,139
[45] Date of Patent: Oct. 29, 1996

[54] SURFACE PLASMON HIGH EFFICIENCY HDTV PROJECTOR

[76] Inventor: Yu Wang, 40-57 Junction Blvd., Corona, N.Y. 11368

[21] Appl. No.: 242,628

[22] Filed: May 13, 1994

[51] Int. Cl.⁶ .............................. H04N 9/31; H04N 5/74
[52] U.S. Cl. .............................. 348/744; 345/84; 345/88; 359/245; 359/263
[58] Field of Search ................... 348/744, 759, 348/760, 761, 762, 766, 791, 767; 345/102, 88, 89, 147, 84; 359/48, 49, 64, 241, 245, 263, 265; 359/276, 240, 359; H04N 9/31, 5/74

[56] References Cited

U.S. PATENT DOCUMENTS

| | | | |
|---|---|---|---|
| 3,834,793 | 9/1974 | McConnell et al. | 350/160 R |
| 4,249,796 | 2/1981 | Sincerbox et al. | 350/370 |
| 4,451,123 | 5/1984 | McNeill et al. | 359/263 |
| 4,686,519 | 8/1987 | Yoshida et al. | 345/102 |
| 5,150,205 | 9/1992 | Um et al. | 348/759 |
| 5,155,617 | 10/1992 | Solgaard et al. | 359/245 |
| 5,157,541 | 10/1992 | Schildkraut et al. | 359/276 |
| 5,347,395 | 9/1994 | Lautenschlager et al. | 359/359 |
| 5,351,127 | 9/1995 | Kung et al. | 359/263 |
| 5,451,980 | 9/1995 | Simon et al. | 345/88 |

OTHER PUBLICATIONS

MPEP 714.22(b).

*Primary Examiner*—John K. Peng
*Assistant Examiner*—Glenton B. Burgess

[57] ABSTRACT

A surface plasmon high efficiency HDTV projector employs voltage-induced color-selective absorption with surface plasmons at metal/liquid crystal interface. When a collimated p-polarized white light (9) is incident at metal (2) and liquid crystal (6) interface, surface plasmon resonance can be excited, certain frequencies of photons will be absorbed without reflection, and the reflected light shows the complementary color. This resonance frequency depends on the dielectric constant of both the metal film and the liquid crystal. If a voltage (8) is applied on the liquid crystal (6) to change its dielectric constant, then the absorption spectrum can be controlled by this voltage. When the p-polarized white light is reflected three times at three interfaces which are set a surface plasmon resonance at blue, green and red respectively, any color can be generated by switching these resonances. Because this device only takes the unwanted colors out of the spectrum, the wanted color almost all pass through, the optical efficiency of this device is very high.

18 Claims, 5 Drawing Sheets

SURFACE PLASMON HIGH EFFICIENCY HDTV PROJECTOR

BACKGROUND OF THE INVENTION

1. Field of the Invention

The present invention relates to electronic display, and more particularly, to projection display and flat panel display based on a novel phenomenon of voltage-induced color-selective absorption with surface plasmons.

2. Prior Art

The high-definition television (HDTV) is one of the most challenging technologies. HDTV projectors are the most favorable devices among HDTV devices because of their big screen size. The current color display projectors, either cathode ray tube projectors or liquid crystal light valve projectors, have very low efficiencies. Their brightness is limited, their structures are complex, and their power consumptions are high.

It is well known that, for prism coupling, surface plasmon resonance waves can be generated at a metal/dielectric interface by a p-polarized light. At surface plasmon resonance, the reflected light vanishes—attenuated total reflection (ATR). This resonance depends on the dielectric constants of both the metal and the dielectric. If an electro-optic material is used as the dielectric, when voltage is applied on the electro-optic material, the dielectric constant of the electro-optic material will change, and the intensity of reflected light can be modulated. There are many reports of using surface plasmon waves to build a light intensity modulator. See, for example, "Electrooptic reflection with surface plasmons" by Yu Wang and H. J. Simon, Optical and Quantum Electronics, vol. 25, pages S925–S933; "Surface-plasmon spatial light modulators based on liquid crystal" by M. E. Caldwell and E. M. Yeatman, Applied Optics, Vol. 31, pages 3880–3891; "All-optical spatial light modulator with surface plasmon resonance" by T. Okamoto, et al., Optics Letters, Vol. 18, pages 1570–1572; U.S. Pat. No. 4,247,796; U.S. Pat. No. 4,451,123; U.S. Pat. No. 5,155,617; U.S. Pat. No. 5,157,541; U.S. Pat. No. 5,347,395; U.S. Pat. No. 5,351,127. All of these devices used lasers as the light sources.

Recently, a new phenomenon of voltage-induced color-selective absorption with surface plasmons has been discovered; "Voltage-induced color-selective absorption with surface plasmons" by Yu Wang, to be published. This phenomenon shows that, when surface plasmon waves are excited at a metal/liquid crystal interface, not only the intensity of reflected light, but also the spectrum of the reflected light can be controlled by an external voltage. The surface plasmon resonance band strongly depends on the materials used for the metal film, by choosing different metal materials, the resonance spectrum band can have a range from less than 50 nm to cover all of the optical visible wavelengths.

Here I introduce my invention of surface plasmon high efficiency HDTV projector, which is based on the voltage-induced color-selective absorption with surface plasmons, is able to generate high brightness image on a big screen with high optical efficiency. This invention does not need color filters to create the color, this invention has fast switching time, this invention can be easily addressed by using semiconductor chips as the substrates, this invention is relatively easy to be fabricated, and this invention can be more efficiently cooled since it is working at the reflection mode.

SUMMARY OF THE INVENTION

This invention is a surface plasmon high efficiency HDTV projector. This invention is based on voltage-induced color-selective absorption with surface plasmons at a metal/liquid crystal interface, which is: when a p-polarized white light is incident at a metal/liquid crystal interface, surface plasmon waves can be excited, those photons in the surface plasmon resonance range will be totally absorbed without reflection, while the photons out of the surface plasmon resonance frequency range will be totally reflected. This surface plasmon resonance frequency depends on the dielectric constant of both the metal and the liquid crystal. If a voltage is applied on the liquid crystal to change the orientation of the liquid crystal moleculars, then the dielectric constant of the liquid crystal will change, and the surface plasmon resonance frequency will change; in other word, we can control the absorption spectrum by the applied voltage and the reflected light shows the color change as complementary color of the absorbed color. If a white light is reflected three times by three such metal/liquid crystal interfaces, which are set at surface plasmon resonance frequencies at three primary colors: red, green and blue respectively, then by applying voltage, these three primary colors can be turned on and off from the surface plasmon resonance, and any color can be generated from the incident white light. In this invention, only the unwanted colors are absorbed, the wanted colors almost all pass through, and this is a projector with very high optical efficiency.

DESCRIPTION OF THE DRAWINGS

1. Cross-section view of basic unit
2. Surface plasmon resonance shift with applied voltage
3. Cross-section view of surface plasmon color modulator (SPCM) using three basic units.
4. Structure of surface plasmon color projector using a unpolarized light
5. Cross-section view of surface plasmon color projector using four basic units.

DRAWING REFERENCE NUMBERS

Figure 1:
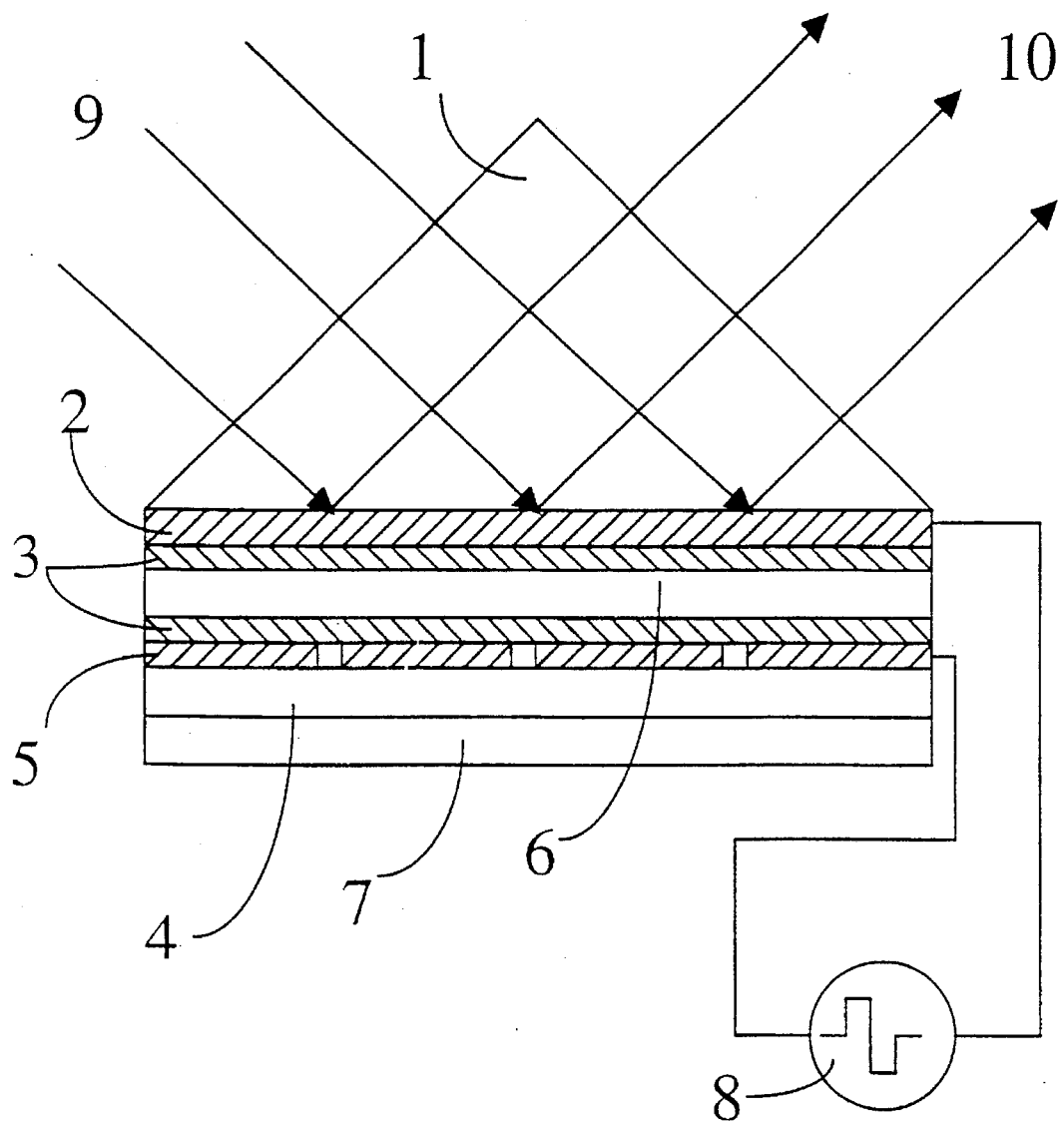

1. High index glass prism
2. Metal film
3. Alignment layer
4. Base chip
5. Electrodes on the base chip
6. Liquid crystal
7. Heat absorber
8. Driving voltage
9. Collimated white p-polarized incident light
10. Reflected color light
11. Basic Unit-1
12. Basic Unit-2
13. Basic Unit-3
14. Outgoing light with a full colored image
15. Surface plasmon color modulator SPCM-1
16. Surface plasmon color modulator SPCM-2
17. Collimated unpolarized incident white light
18. Transmitted light from SPCM-1.
19. Outgoing light which contains two full colored images in crossed polarization
20. Surface plasmon white light intensity modulator

DETAILED DESCRIPTION OF THE PREFERRED EMBODIMENT

The surface plasmon high efficiency HDTV projector introduced here are based on a novel phenomenon of voltage-induced color-selective absorption with surface plasmons at several metal/liquid crystal interfaces. Each of such interfaces is a part of a basic unit. And several such units can form a projection device. When a white light is incident on such a projection device, both the color and intensity of transmitted light can be modulated, and a full color image can be generated.

1. Basic Unit

The cross-sectional view of a basic unit for building a surface plasmon projector is shown in FIG. 1. A high index prism (1) is used for the coupling, a metal film (2) is evaporated on hypotenuse of the prism (1), two alignment layers (3) are made upon the metal film (2) and a base chip (4) respectively. The base chip (4) has matrix pixel electrodes (5) while the metal film is connected as the common ground electrode. A liquid crystal layer (6), functions as an electrooptic active layer, is sandwiched by the prism (1) and the base chip (4). Adjacent the substrate (4) is a heat absorber (7) to extract the heat generated by surface plasmon absorption. An active matrix driving voltage (8) is added on each of these pixels through the matrix pixel electrode (5) and the metal film (2). When a collimated p-polarized white light (9) is incident on the prism/metal interface, surface plasmon waves can be excited at metal/liquid crystal interface; those photons have the frequencies in the surface plasmon resonance range are absorbed, and the reflected light (10) shows a complementary color. When a voltage is applied on a pixel, the orientation of the liquid crystal molecules in this pixel will change, and the dielectric constant of the liquid crystal in this pixel will change. Since the surface plasmon resonance depends on the dielectric constant of the liquid crystal, therefore the surface plasmon resonance absorption of this pixel can be controlled by the applied voltage, and the reflected color can be controlled. Therefore, each pixel will generate a color reflection spot, and the reflected light contains a color image.

A single pixel experiment sample was prepared by thermally evaporating 55 nm of silver film onto a 60° SF6 glass prism. A 50 nm $M_gF_2$ layer was then evaporated at a 50° oblique angle off the normal onto the silver film as the liquid crystal alignment layer. The same alignment layer was evaporated onto an ITO glass plate as the substrate. The cell was assembled with the alignment directions parallel, with 4 μm spacers; and filling was by capillary action with BL009 liquid crystal (Merck). A white light with divergence angle of ±1° was incident on the prism assembly through a polarizer that selected the p-polarized wave. The reflected light was projected onto a white screen and the spectrum was measured. A 2 kHz AC voltage was used to drive the cell. The incident angle at the prism/metal interface was 62°.

Figure 2:
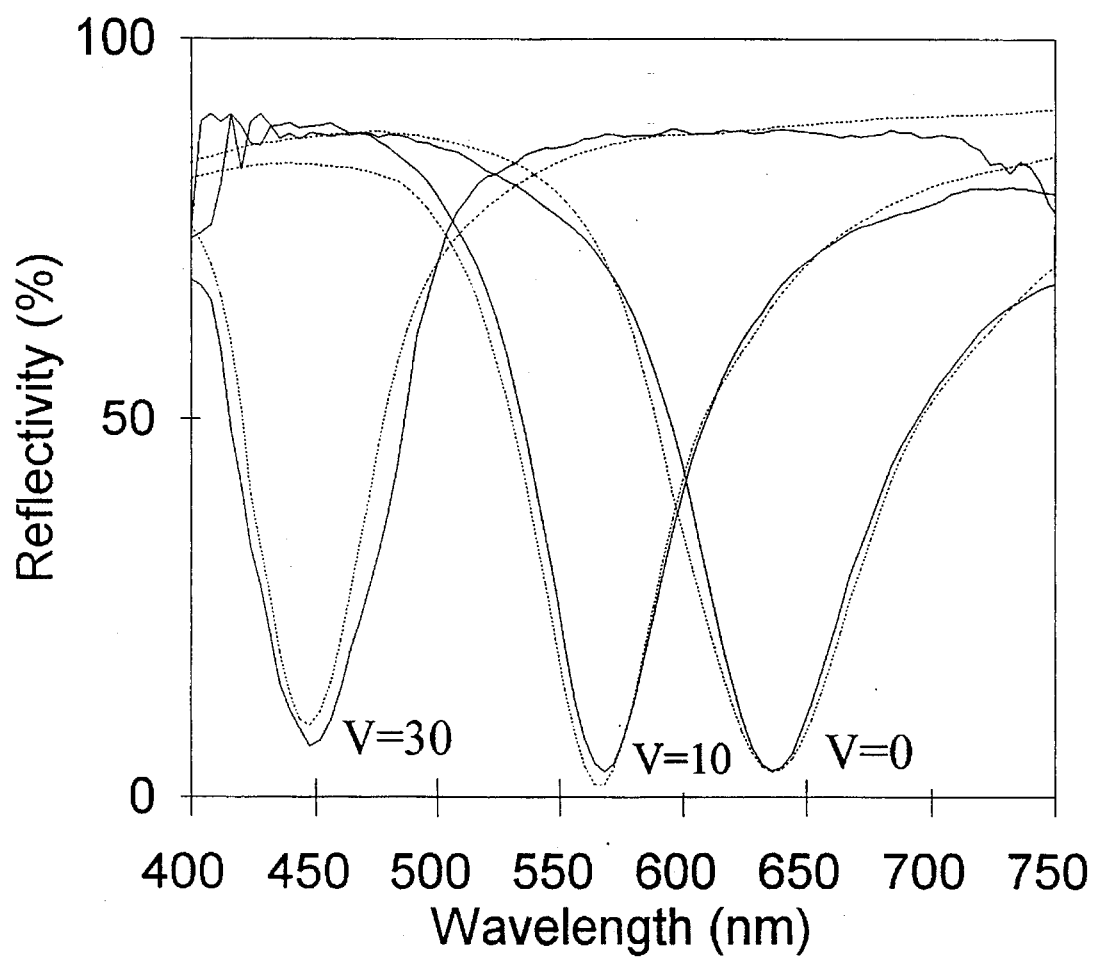

The experimental results are plotted in FIG. 2. Here the solid curves are the experimental data while the dotted curves are the calculated theoretical calculations by solving Maxwell's equations. This cell was initially set at a surface plasmon resonance wavelength of 640 nm while the applied voltage was zero. The red color was absorbed, and the reflected light looked cyan. When a 10 volt rms was applied to the sample, the surface plasmon resonance shifted to 560 nm, the green color was absorbed, and the reflected light looked magenta. When the voltage was increased to 30 volt rms, the surface plasmon resonance shifted to 450 nm, the blue color was absorbed, and the reflected light looked yellow.

Since surface plasmons are surface waves, only a very thin liquid crystal layer, less then one wavelength, is effective for exciting surface plasmons. The switching time of surface effect is much faster than that in bulk materials. A surface plasmon switching time at metal/liquid interface was 50 times faster than the switching time of the bulk liquid crystal material had been reported by M. E. Caldwell and E. M. Yeatman. Because the liquid crystal layer is very thin, the heat generated by surface plasmon absorption at metal/liquid crystal interface can be effectively passed to the base chip and the heat absorber, therefore a powerful light source can be used as the incident light to generate a very bright image.

In this basic unit, a grating or micro-prisms can be used to replace the prism to couple the incident light to the metal/liquid interface to excite the surface plasmon waves; and a solid state electro-optical material can be used to replace the liquid crystal material as the electro-optic active layer.

2. Surface plasmon color modulator (SPCM)

Figure 3:
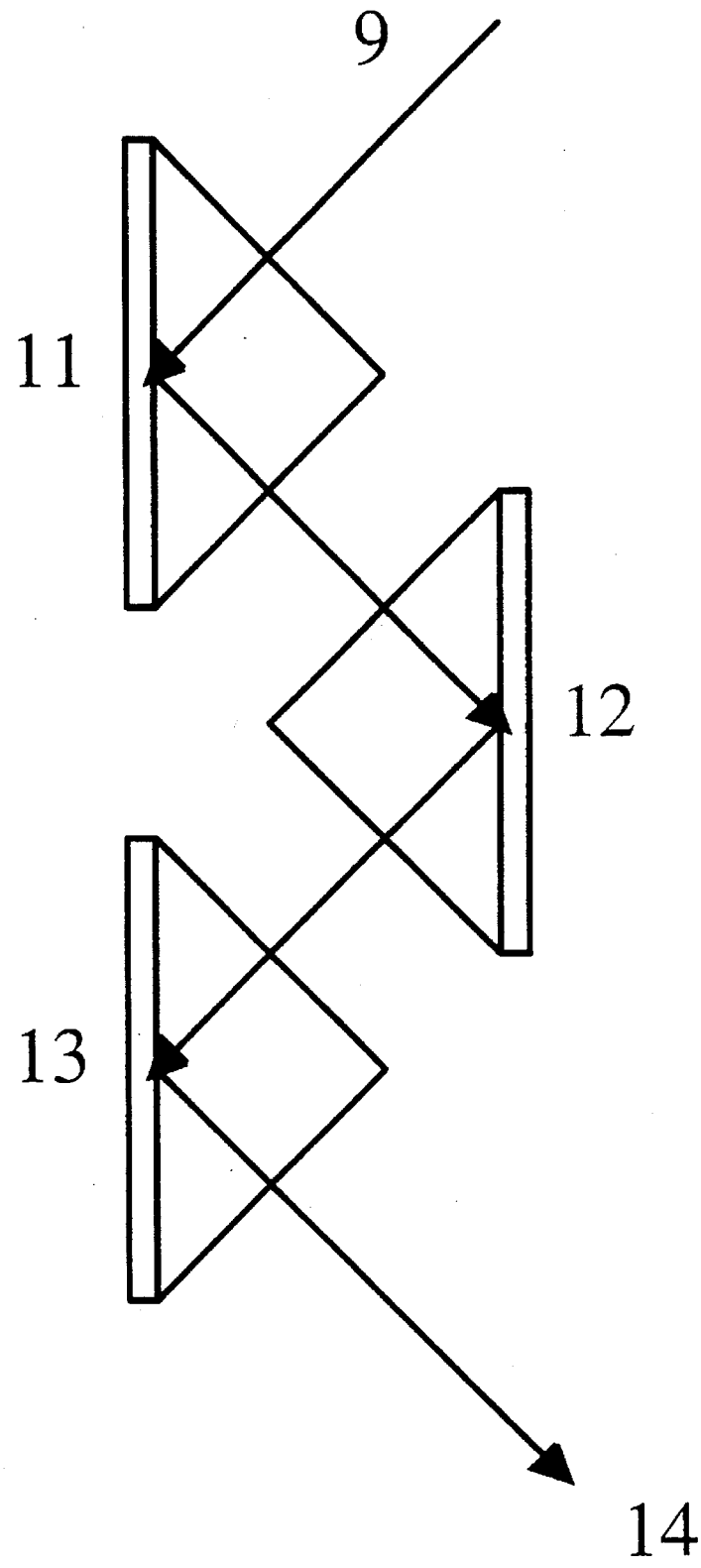

A surface plasmon color modulator (SPCM) can be constructed by three basic units: Unit-1, Unit-2 and Unit-3 as the cross-sectional view is shown in FIG. 3. The incident p-polarized white light is reflected three times by Unit-1 (11), Unit-2 (12) and Unit-3 (13). Initially, by applying bias voltages or by rotating the prisms, Unit-1 (11) is set at the surface plasmon resonance of blue, Unit-2 (12) is set at the surface plasmon of green, and Unit-3 (13) is set at the surface plasmon resonance of red, all of the visible photons form the incident light are absorbed and there is no outgoing light. For three aligned pixels (which means these three pixels can be traced by the same light ray) in three units respectively, if a voltage is applied on the corresponding pixel of Unit-1 (11) while the pixels of Unit-2 (12) and Unit-3 (13) still have zero voltage, then Unit-1 (11) is out of surface plasmon resonance of blue, then a blue color spot is generated form the pixel and shown on a screen; if a voltage is applied on the corresponding pixel of Unit-2 (12) to push its surface plasmon resonance away from green while the pixels of Unit-1 (11) and Unit-3 (13) have zero voltage, then a green color spot is generated from this pixel and shown on the screen; if a voltage is applied on the corresponding pixel of Unit-3 (13) to push its surface plasmon resonance away from red while the pixels of Unit-1 (11) and Unit-2 (12) have zero voltage, then a red color light is generated from this pixel and shown on the screen. If the surface plasmon resonances of these three corresponding pixels are all shifted to either IR or UV by applied voltages, then no visible light is absorbed, and the outgoing light (14) shows a white spot.

If a blue color image signal is added on Unit-1 (11), a green color image signal is added on Unit-2 (12), and a red color image signal is added on Unit 3 (13), then Unit-1 (11) generates a blue image, Unit-2 (12) generates a green image, and Unit-3 (13) generates a red image. Therefore, the outgoing light (14) contains a full color image, and this image can be projected on a big screen by a projection lens.

Figure 4:
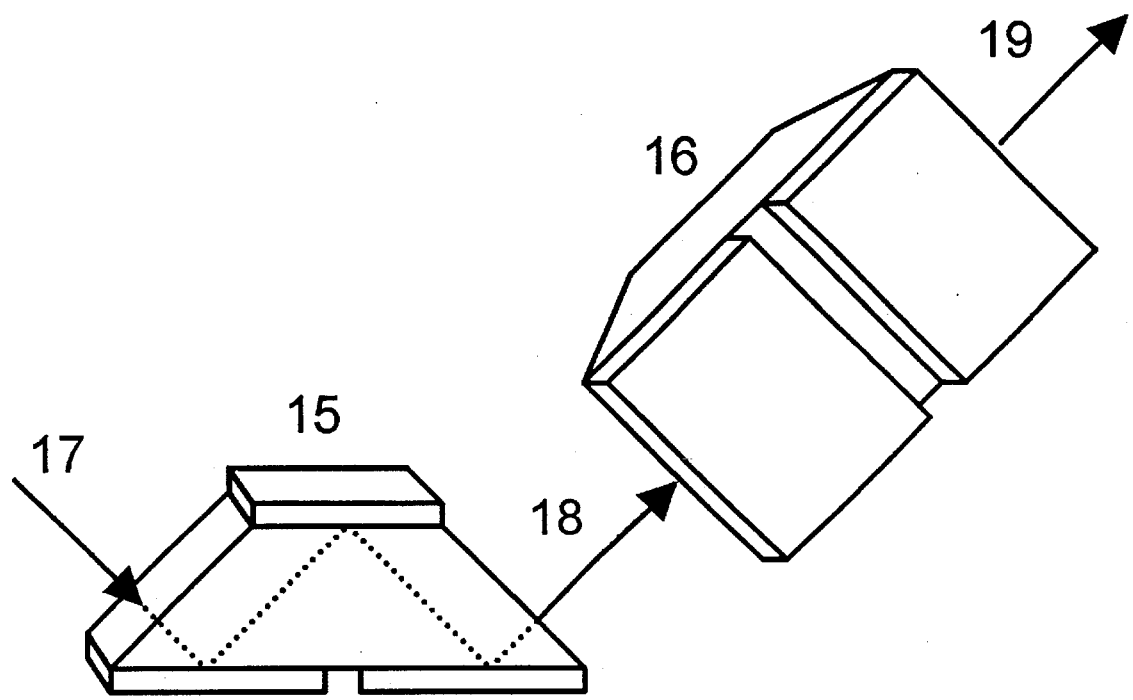
Figure 5:
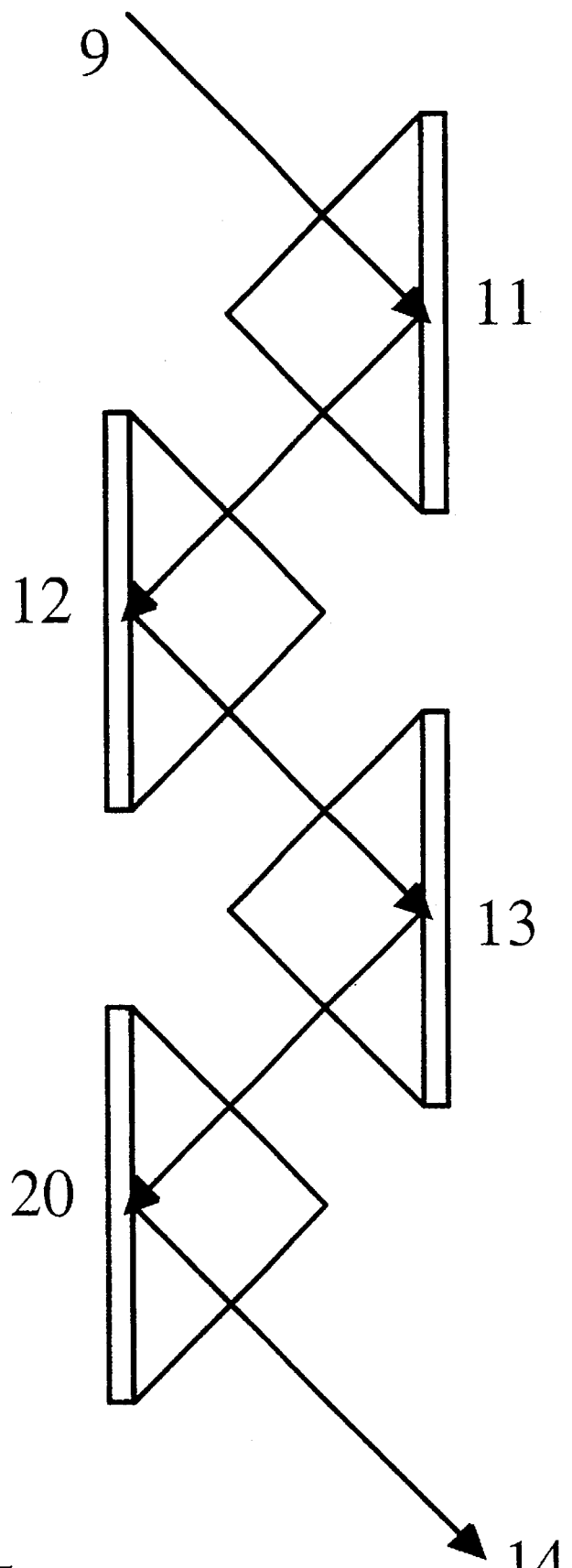

3. Surface plasmon color projector using unpolarized white light A surface plasmon color projector using unpolarized white light is shown in FIG. 4. Two identical SPCMs, SPCM-1 (15) and SPCM-2 (16), are put in positions perpendicular to each other in such a way, that the SPCM-2 (16) has rotated 90° using the transmitted white light (18) from the SPCM-1 (15) as rotation axis. Here the three basic units of each SPCM have been combined together to form a trapezoid shaped dove prism and light is reflected tree times inside the dove prisms. When a collimated unpolarized white light (17) is incident on SPCM-1 (15), the p-polarized light, which has a polarization in this page, is modulated; while the s-polarized light which has the polarization perpendicular to this page is left untouched. The transmitted light (18), which has reflected three times inside SPCM-1 (15), contains a color image which has polarization in the page upon a white light background which has a polarization perpendicular to the page. The transmitted light (18) from SPCM-1 is then incident on SPCM-2 (16). Because SPCM-2 (16) has rotated 90° relative to SPCM-1 (15) using light beam (18) as the rotation axis, the p-polarized light for SPCM-2 (16) is in the direction perpendicular to the page. SPCM-2 (16) modulates the light has polarization perpendicular to the page but left the light has polarization in the page, which has been previously modulated by SPCM-1 (15), untouched. Therefore, the unpolarized white light is modulated and two color images in crossed polarization are generated in the outgoing light (19). In this device, almost all of the wanted color light informations are passed through this device, there is little optical loss except the reflection at air/glass interface, which can be minimized by anti-reflection coatings.

For surface plasmon color projector, the grey scales can be controlled by the conventional pulse modulation, which is, if we keep one spot bright for a short period of time and dark for rest of the time, then that spot looks grey. This method needs fast response liquid crystal material.

Another approach for the grey control of surface plasmon projector is to change the overlaps of the surface plasmon absorption curves of the corresponding pixels of the three basic units. For example, if the surface plasmon resonance of a pixel of Unit-1 is shifted to green-blue by applied voltage while all pixels of Unit-2 and Unit-3 keep zero voltage, then this pixel of Unit-1 will generate a dim purple-blue color, if this resonance is shifted to purple-blue, this pixel will generate a dim green-blue color, if this surface plasmon resonance spends half time at green-blue and other half time at purple-blue, then a viewer will see a dim blue color. By controlling how far away the surface plasmon resonance from the center blue color, grey scales of blue color can be achieved; similar grey scales of red and green color can be generated.

The present invention has many advantages over the current color projection devices. It can generate very bright image on a big screen, because the heat can be effectively extracted by the heat absorber; it can have very high optical efficiency, because only the unwanted colors are absorbed and wanted colors can all pass through; it has fast switching time, because surface plasmon wave is a surface effect, the switching time at metal/liquid interface is much faster then in that of the bulk liquid crystal material, faster switching time can be reached by using ferro-electric liquid crystal materials or solid state electro-optical materials; it can be easily addressed, because a semiconductor chip with many matrix transistors or diodes can be used as the base chip; it can be easily fabricated, because no masking is need after the transistors are made; it can generate excellent colors by choosing the proper materials as the metal film. In addition, this projector is naturally a 3D projector, since it can generate two images in a cross polarized manner, a viewer wearing cross polarized glasses will see a 3D image.

4. Surface Plasmon Color Projector Using Four Basic Units

A surface plasmon color projector is the combination of four basic units as shown in FIG. 6. The first three units (11, 12, 13) form a SPCM and function similar to a color wheel to generate sequential primary colors: red, green and blue. The last basic unit (20) is made by a metal film which has a wide surface plasmon resonance to cover all of the visible spectrum. The last basic unit (20) functions as a surface plasmon white light intensity modulator. With zero voltage, all of the pixels of the last basic unit is set at the surface plasmon resonance of the visible and no light is reflected, by applying voltage on pixels of this last basic unit (20), a monochrome image can be generated. When a voltage is added on the first unit (11) while the other two units have no voltage, the blue color is out of the surface plasmon resonance, and the light incident on the last basic unit (20) is blue. Then a voltage is add on the second basic unit (12) while the voltage of the first basic unit and the third basic unit have been turned off, the green color is off the surface plasmon resonance, and the light incident on the last basic (20) unit is green. Then a voltage is add on the third basic unit (13) while the voltages of the first basic unit and the second basic unit have been turned off, the red color is off the surface plasmon resonance, and the light incident on the last basic unit (20) is red. By turning the voltages of the three basic units on and off sequentially, we can generate sequential primary colors. This sequential color light is then incident on the last basic unit (20). The pixels of the last basic unit (20) have different reflectivity depends on applied voltages, the last basic unit (20) generates an image with grey scales, and this image is projected onto a screen by a projection lens. By generating a sequential red, green and blue images sequentially, a viewer can see a full color image.

The advantage of such a device is that: it has less requirement for a good beam collimation; its structure is relative simple; the first three basic units may not have to have millions of pixels, even a single pixel in each of the first three basic unit may do the job. Only the last basic unit needs to have millions of pixels and an active matrix chip to drive these pixels, the manufacturing cost can be significantly lower. This device also has all of the advantages as discussed before, except the optical efficiency is reduced to about ⅓.

What is claimed is:

1. A surface plasmon high efficiency HDTV projector based on voltage-induced color selective absorption, whose transmission spectrum and intensity can both be controlled by an applied voltage, comprising:

a) a collimated p-polarized white light source for providing incident beam;

b) two surface plasmon color projectors (SPCP), for generating full color image, at a position perpendicular to each other using the propagation direction of the incident white light beam as rotation axis, wherein each SPCP is a combination of two or more basic units and each SPCP modulates color and intensity p-polarized component of the incident light relative to its own position;

c) a zoom system to project the color image;

d) a screen for receiving the output of the zoom system; and e) wherein, when the collimated white light beam is incident on the first SPCP, p-polarized component of the incident light relative to its own position is modulated, the beam is then incident on the second SPCP which also only modulate the p-polarized component of incident light relative its own position, the second SPCP has rotated 90 degrees using the incident beam as the rotation axis, the p-polarization direction of the second SPCP is in the s-polarization direction of the first SPCP after passing the two SPCPs, the incident white light becomes modulated and contains two color images which are in cross polarized directions, these two color images are then project on the screen by the zoom system.

2. The basic units defined in claim 1 comprising:

a) a high refraction index prism for the coupling;

b) a metal film upon the hypotenuse of the prism;

c) a base chip with many pixel electrodes as the substrate;

d) a layer of electro-optical (EO) material sandwiched by the metal film and the base chip;

g) an addressing circuits to apply voltage to each pixel of the substrate;

f) a heat absorber attached to the substrate to extract the heat generated by surface plasmon absorption; and g) means a surface plasmon resonance is excited at metal/electro-optical material interface, when a voltage is applied at one pixel of the basic unit, dielectric constant of the EO material changes, the surface plasmon resonance absorption spectrum changes, and reflected light form the basic unit shows a color change as complementary color of absorbed color.

3. The basic unit of claim 1 wherein the metal film is a multiple layer film.

4. The basic unit of claim 2 wherein the metal film is an alloy film.

5. The basic unit of claim 2 wherein the electro-optical material is a liquid crystal layer with alignment layer on both side of the liquid crystal layer.

6. The basic unit of claim 2 wherein the prism is a combination of macro-prisms.

7. The basic unit of claim 2 wherein the prism is a prism grating.

8. The multiple layer film of claim 3 is a layer combinations of Ag, Al, Cu, Rh, and Si layers.

9. The surface plasmon color projector of claim 1 wherein the number of basic units is three, one of the basic unit modulate red color, one of the basic unit modulate green color, and one basic unit modulate blue color.

10. The surface plasmon color modulator defined in claim 1 is a combination system includes three basic units, by turning the driving voltage of the three basic units on and off alternatively, a sequential primary color (red, green and blue) can be generated; therefore, this surface plasmon color modulator is a surface plasmon sequential primary color generator.

11. The surface plasmon projector of claim 1 wherein grey scales are controlled by overlap of surface plasmon absorption curves of the basic units.

12. The basic unit of claim 2 wherein the surface plasmon resonance is wide enough to cover all of optical visible spectrum, no visible light is reflected at the surface plasmon resonance; means when a voltage is applied on a pixel, the surface plasmon resonance of this pixel begins to move out of the visible spectrum, and this pixel begins to reflect visible light, reflectivity of this pixel keeps increase with applied voltage until a maximum reflectivity is reached; therefore, this basic unit is a white light modulator.

13. The surface plasmon color projector of claim 1 wherein the number of basic units is four, the first three basic units function as the surface plasmon sequential primary color generator to provide sequential primary colors (red, green and blue), and the last basic unit functions as the white light modulator to generate a image with grey scales.

14. A 3D surface plasmon high efficiency HDTV projector based on voltage-induced color-selective absorption, whose transmission spectrum and intensity can both be controlled by an applied voltage, and two images can be generated in crossed polarization, comprising:

a) a collimated unpolarized white light source for providing incident beam;

b) two surface plasmon color modulators to generate two full color image in crossed polarization from the incident white light, the second surface plasmon color modulator is in a position which has been rotated 90° from the first surface plasmon color modulator using the transmitted light from the first surface plasmon color modulator as the rotation axis;

c) a zoom system to project the color image;

d) a screen for receiving the output of the zoom system; and f) means when the collimated unpolarized white light is incident on the first surface plasmon color modulator, both spectrum and intensity of transmitted p-polarized light can be controlled by the first surface plasmon color modulator, and a full color image with grey scales can be generated; then this transmitted light is incident on the second surface plasmon color modulator, since the second surface plasmon color modulator is in a position which has been rotated 90° from the first surface plasmon color modulator using the transmitted light from the first surface plasmon color modulator as the rotation axis, p-polarized direction also has been rotated 90°, spectrum and intensity of transmitted p-polarized light of the second surface plasmon color modulator, which is s-polarized light relative to the first surface plasmon color modulator, can be controlled by the second surface plasmon color modulator, and a second full color image in a crossed polarization with grey scales can be generated; the two color image are then projected on the screen by the zoom system, and a viewer can see a 3D image by wearing cross polarized glasses.

15. The surface plasmon color modulator of claim 14 is a combination of many basic units; when the p-polarized white light is incident on the surface plasmon color modulator, each basic unit modulates certain color or colors; and both spectrum and intensity of the transmitted light are modulated, and a color image is generated.

16. The surface plasmon color modulator of claim 14 is a stack of many basic units, each basic unit modulates a portion of the incident beam.

17. The 3D surface plasmon high efficiency HDTV projector of claim 14 can be used to modulate the interference pattern of the incident light to generate a holographic image, therefore this 3D surface plasmon high efficiency HDTV projector is a holographic projection display.

18. The 3D surface plasmon high efficiency HDTV projector defined in claim 15 wherein its transmission spectrum can be continuously changed by applied voltage, therefore this 3D surface plasmon high efficiency HDTV projector is a spectrophotometer.

* * * * *